F. LOUDON.

SHOW CASE.

APPLICATION FILED MAR. 16, 1918.

Reissued Dec. 17, 1918.

14,571.

2 SHEETS—SHEET 1.

Inventor
Fred Loudon
By Moulton & Lorrance
Attorneys.

THE NORRIS PETERS CO., PHOTO-LITHO., WASHINGTON, D. C.

F. LOUDON.

SHOW CASE.

APPLICATION FILED MAR. 16, 1918.

Reissued Dec. 17, 1918.

14,571.

2 SHEETS—SHEET 2.

Inventor
Fred Loudon
By Moulton & Livingstone
Attorneys.

THE NORRIS PETERS CO., PHOTO-LITHO., WASHINGTON, D. C.

UNITED STATES PATENT OFFICE.

FRED LOUDON, OF WILMINGTON, ILLINOIS.

SHOW-CASE.

Specification of Reissued Letters Patent. Reissued Dec. 17, 1918.

14,571.

Original No. 1,179,444, dated April 18, 1916, Serial No. 44,722, filed August 10, 1915. Application for reissue filed March 16, 1918. Serial No. 222,969.

*To all whom it may concern:*

Be it known that I, FRED LOUDON, a citizen of the United States of America, residing at Wilmington, in the county of Will and State of Illinois, have invented certain new and useful Improvements in Show-Cases of the general type shown in my earlier Patent No. 1,123,332, issued Jan. 5, 1915, designed more particularly for holding and dispensing cigars for sale, though it is to be understood that other objects can be held, displayed, and dispensed therein.

A primary object of the invention is to provide a show case of this character which permits ready access to the articles held within the show case by the customer thereof without the necessity of removing said articles or containers therefor from the case, as is now a common method in the retail of cigars and like products. A further object of the invention resides in the provision of a novel means for controlling access to the articles within the show case by the salesman back of the case, whereby entrance to or closure of the case is controlled at all times by the salesman who may open or close the same at will. Still further objects reside in a particularly effective mechanism for opening and closing the case and for maintaining the same in closed position. All of these features, together with many others not particularly enumerated at this point, will appear as better understanding of the invention is had from the following description taken in connection with the accompanying drawings, in which—

Like reference characters refer to like parts in the different views of the drawings.

Figure 1:
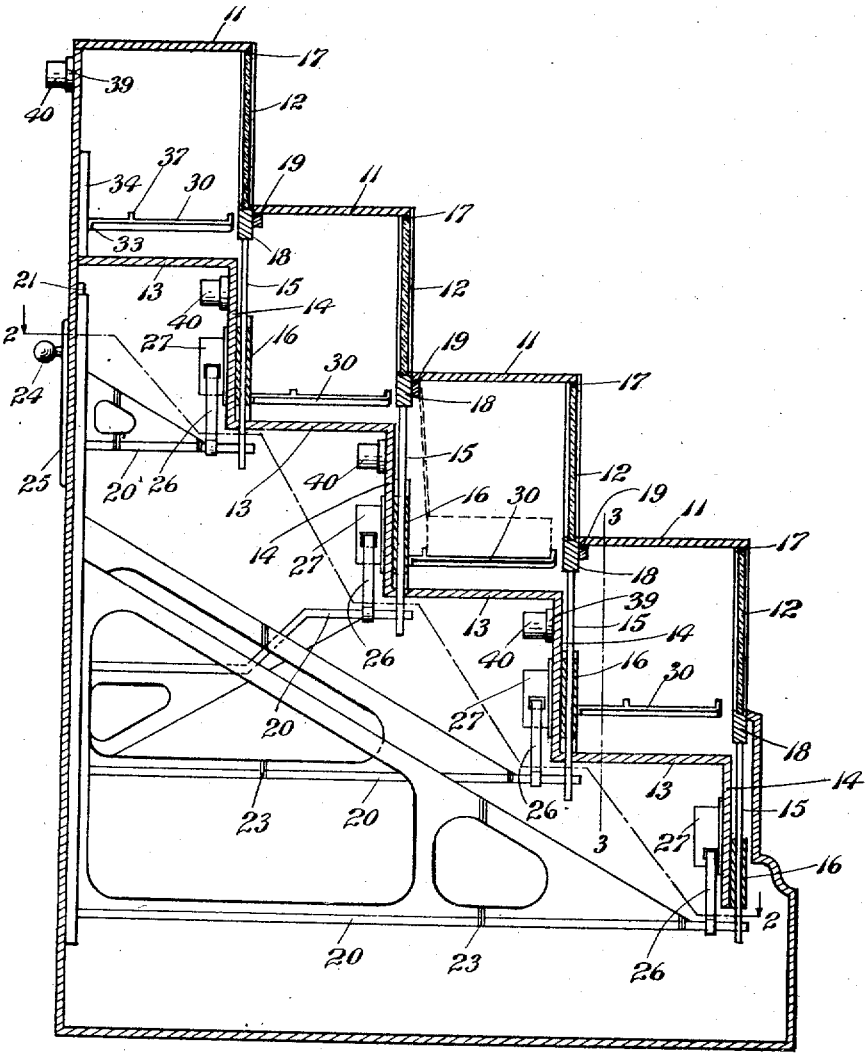
Figure 1 is a vertical transverse section through the show case.
Figure 2:
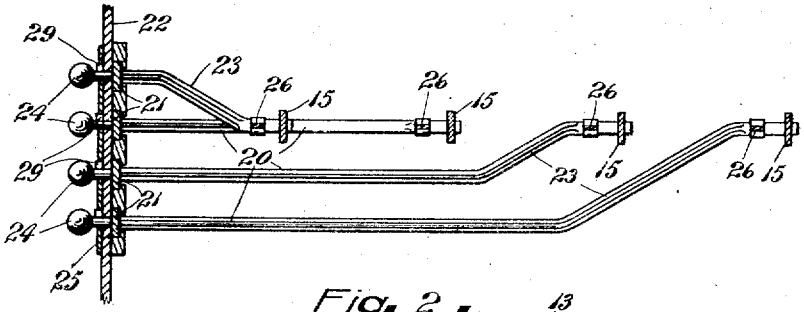
Fig. 2 is a horizontal section taken substantially on the broken line 2—2 of Fig. 1.
Figure 3:
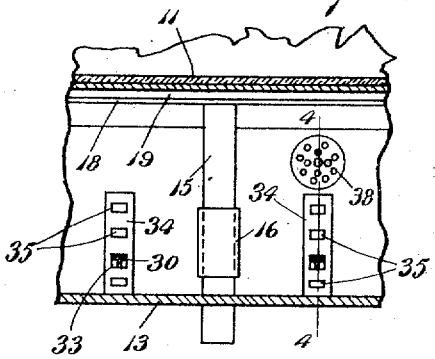
Fig. 3 is a fragmentary vertical section on the line 3—3 of Fig. 1.
Figure 4:
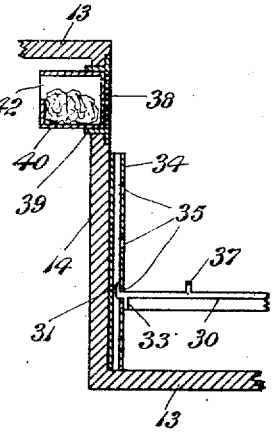
Fig. 4 is a vertical section on the line 4—4 of Fig. 3.
Figure 6:
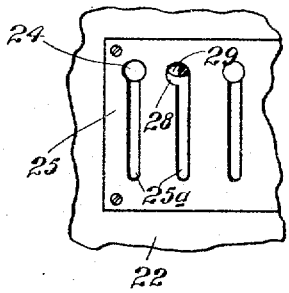
Fig. 6 is a fragmentary rear elevation showing the immediate manually operated means for moving the doors of the various compartments of the case to open or closed position and for locking the same in closed position, one of said operating devices being shown partly in section.
Figure 5:
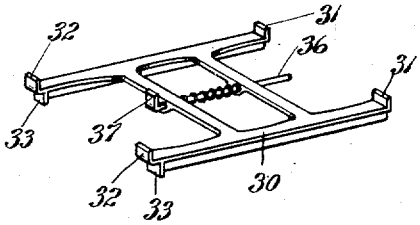
Fig. 5 is a perspective view of a box holder, a plurality of which may be used in the case.

In construction a cigar case 10 is provided, the same having a series of stepped compartments, the top 11 of each being of glass which may be held in place in any suitable manner. The front walls 12 of the compartment are mounted to slide vertically and may be dropped to lower position to allow access from the front to the various compartments of the case. The bottoms and backs of the compartments are provided with horizontal and vertical walls 13 and 14, respectively. The doors 12 are mounted to slide directly in front of the walls 14 located below them, and have depending guide stems 15 slidably mounted in guides 16 on said walls. Preferably, the upper edges of the doors 12 are provided with felt strips 17 which, coming in contact with the under sides of the tops 11 of the compartments, form a tight closure to the compartments when the doors are closed. The doors 12 closing the fronts of the various compartments, preferably, are formed of glass set in a suitable frame, the bottom rail 18 of which, for each door except the foremost one, carries a felt covered strip 19 to close the joint between the door and the rear edge of the adjacent top member 11. The doors 12 are actuated by a series of arms 20, one being used for each door, and the front ends of the arms have connection to the lower ends of the stems 15, after said stems have passed through the bottom compartment walls 13. The rear ends of the arms are connected to vertical strips 21 slidably mounted for vertical movements in suitable guides located against the inside of the rear wall 22 of the case. The arms 20 may be offset as shown at 23 in Fig. 2, to clear each other and allow the stems 15 to be mounted in alinement. Each strip 21 adjacent its upper end has a handle 24 which passes through a slot in the rear wall 22 of the case, a metal plate 25 having slots 25ª corresponding to the slots in the wall being secured to said rear wall of the case, as shown in Fig. 6, with the slots in the plate and wall registering. Doors 12 are normally held in raised position and to aid in holding them in such position, tapes 26 may be attached at their lower ends to the operating arms 20 and wound around spring drums at 27 fixed on the rear face of the vertical compartment walls 14. The slots 25[a] each have a lateral branch 28 at their upper end and each handle 24 is provided with a laterally extending finger 29 which may be moved to enter the branch 28 by turning the handle, and when thus positioned, the doors 12 are held in closed position, and practically locked against opening until the handle is turned to proper position.

Supporting shelves for the cigar boxes are provided in my invention, each of the shelves comprising a skeleton frame 30 having two short upstanding lugs 31 at its front end and two similar lugs 32 at its rear end. The rear end of the frame also has two depending lugs 33 a short distance in front of the lugs 32. On the walls 14 a series of pairs of supporting members 34 are mounted vertically and in spaced apart relation, each being formed from sheet metal into rectangular tubular form, the front faces of which have a vertical series of apertures 35 cut therein. A shelf may be attached to any pair of these supports by inserting the lugs 32 into a pair of apertures 35 located in the same horizontal plane, and the shelf then moved to substantially horizontal position or until the lugs 33 bear against the outer faces of the members 34. It is obvious that the plurality of apertures 35 permit an adjustment of the shelf to different positions for different depths of boxes, the object being to have all of the boxes in a compartment lie in the same plane at their upper edges. A spring latch 36 is mounted on the frame 30 and has an upturned lug 37, between which and the lugs 31 a box may be held. Each compartment may also be provided with a humidifier. The rear wall 14 of each compartment has an opening cut therethrough in which a perforated plate 38 is inserted, it having a rearwardly extending annular flange 39 seated in the opening, which flange is adapted to support a cylindrical container 40, the front end of which is open and in which a moistened sponge 41 may be placed. The rear end of the cylinder may be provided with an opening 42 for entrance and removal of the sponge.

I claim:

1. A show case having a series of compartments arranged in stepped relation, the front wall of each compartment being slidable downward into the case to uncover the compartment, operating arms connected to the respective front walls, slides connected to the arms and mounted against the rear wall of the case, said wall having vertical slots, and operating handles on the slides, said handles projecting through the aforesaid slots.

2. A show case having a series of compartments arranged in stepped relation, the front wall of each compartment being slidable downward into the case to uncover the compartment, operating arms connected to the respective front walls, slides connected to the arms and mounted against the rear wall of the case, said wall having vertical slots, and operating handles on the slides, said handles projecting through the aforesaid slots, said slots having lateral branches at their upper ends, and the handles having lateral fingers adapted to enter said branches to lock the handles.

3. A show case having a series of compartments arranged in stepped relation, the front wall of each compartment being slidable downward into the case to uncover the compartment, a rear wall to the case having a plurality of vertical slots therein, each of said slots at one end having a lateral branch, operating arms connected to the respective front walls of the compartments, an operating handle connected with each arm and extending through a slot in the rear wall of the case, each of said handles being mounted to turn about a horizontal axis and having a lateral finger adapted to enter the lateral branch in the slot with which the handle is associated to lock the handles against movements lengthwise of the slots, and thereby hold the operating arms and front walls of the compartments against movement.

In testimony whereof I affix my signature.

FRED LOUDON.

Copies of this patent may be obtained for five cents each, by addressing the "Commissioner of Patents, Washington, D. C."